March 6, 1945.  H. P. HOPP ET AL  2,370,728
MULTIPLE CHAIN LADDER
Filed Dec. 22, 1942   2 Sheets-Sheet 2
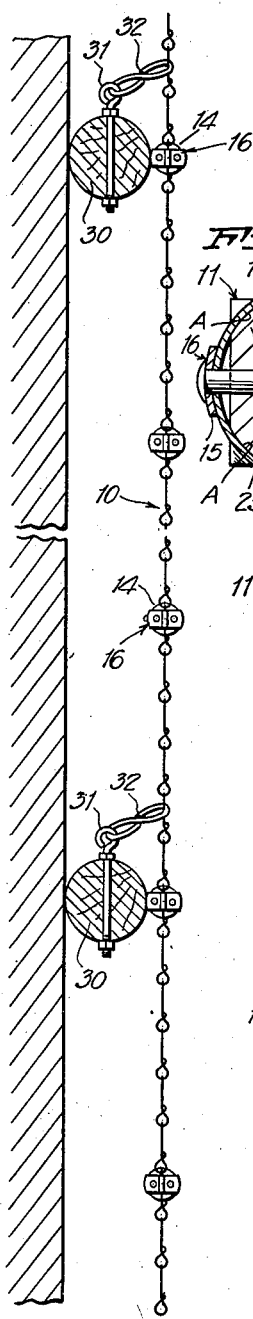
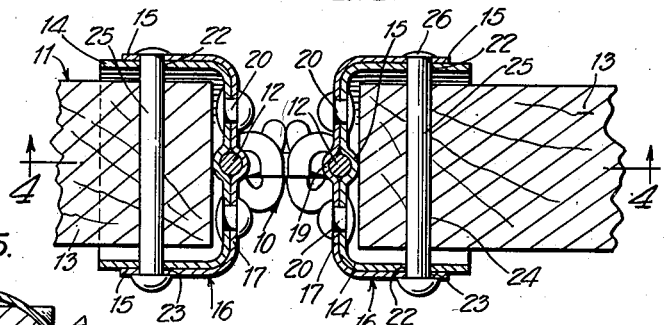
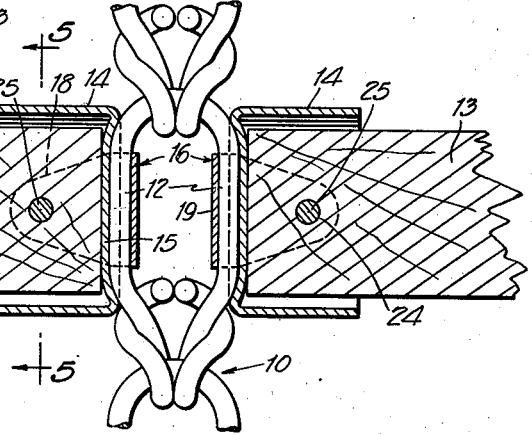
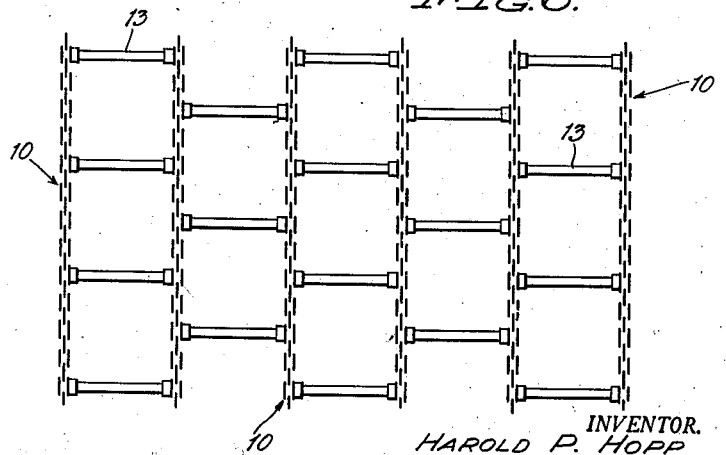
INVENTOR.
HAROLD P. HOPP
EDWARD KUNZELMAN.
BY
ATTORNEYS.

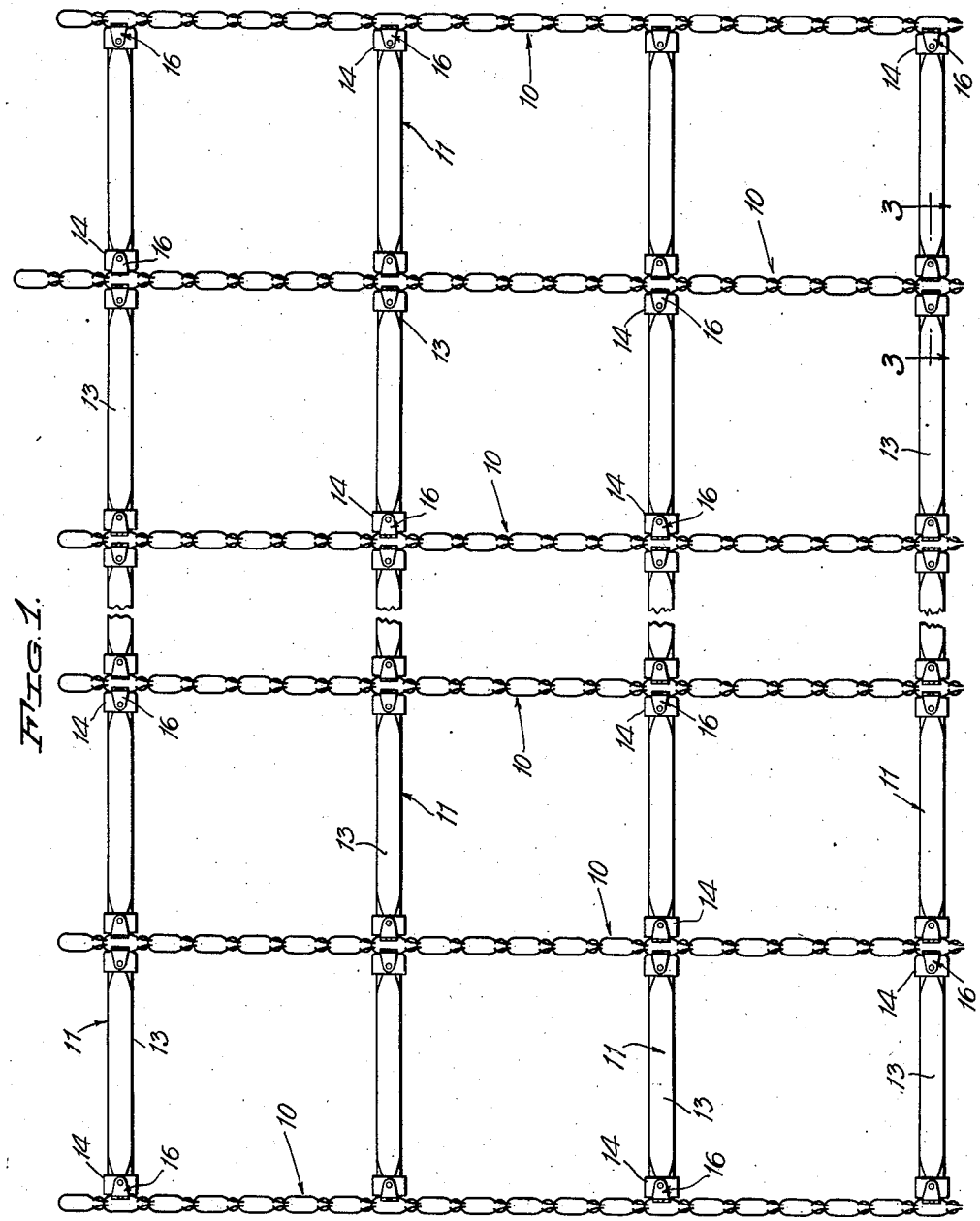

Patented Mar. 6, 1945

2,370,728

UNITED STATES PATENT OFFICE 2,370,728

MULTIPLE CHAIN LADDER

Harold P. Hopp, Englewood, N. J., and Edward Kunzelman, Mount Vernon, N. Y., assignors to H. K. Metal Craft Manufacturing Co., New York, N. Y.

Application December 22, 1942, Serial No. 469,792

1 Claim. (Cl. 228—40)

This invention relates to new and useful improvements in chain ladder constructions and more particularly it pertains to a construction embodying a plurality of chain ladders operatively connected together to form a net-like structure.

While in the following specification, the structure herein disclosed will be generally referred to as a multiple chain ladder, it is to be understood that the said structure also lends itself readily to use as a cargo net or sling.

It is one object of the invention to provide a novel construction of such a nature that the advantages and the facilities of several single chain ladders may be obtained in a single, unitary structure.

Such a device has advantages over single ladders, in that it makes for speed in the provision of preparations for abandoning ship and also permits of handling a greater number of persons under such conditions.

It is another object of the invention to provide a novel structure which is also capable of use as a cargo net or sling employed in loading and unloading vessels.

It is a further object of the invention to provide a novel construction by means of which the assembly of the several parts may be accomplished with facility.

Still a further object of the invention resides in a novel construction which provides sufficient flexibility to permit of ready rolling the structure upon itself for storage when not in use and a free and ready unrolling thereof, without fouling, when desired for use.

A still further object of the invention resides in a novel construction in which there is an appreciative saving of materials over that required in the manufacture of single or separate ladders.

Other objects and advantages will become apparent as the nature of the invention is better understood for which purpose reference will now be had to the accompanying drawings and the following specification and claim.

In the drawings,

Figure 1 is a view in elevation partly broken away illustrating a construction which presents the equivalent of five single chain ladders, Figure 2 is a view in side elevation partly broken away and partly in section illustrating a structure constructed in accordance with the present invention in operative position suspended along the side of a ship, wall or the like, Figure 3 is a detail sectional view on an enlarged scale taken substantially on the line 3—3 of Figure 1, Figure 4 is a detail sectional view taken substantially on the line 4—4 of Figure 3, Figure 5 is a detail sectional view taken substantially on the line 5—5 of Figure 4, and;

Figure 6 is a view in elevation illustrating a slightly modified form of the invention.

Referring specifically to the drawings by reference character, a plurality of chains arranged in spaced parallel relation provide the side chains or stiles 10 of a plurality of ladders. The several stiles 10 are maintained in their spaced relation by means of steps or rungs 11 which are disposed between adjacent stiles and which are connected at their ends to the stiles 10.

The links of the chains which form the stiles 10 are of a type which present two spaced legs 12 of which the well known lock link chain is one good example.

As illustrated in the drawings, the rungs are attached to the links and the structure by which this is accomplished will now be described.

In the illustrated embodiment of the invention, the rungs 11 are formed of wood and are of square cross-sectional shape having tapered or rounded ends 13.

The ends of the rungs 11 are enclosed in metal caps 14 the closed end wall of which is formed with a depressed channel 15 preferably of a depth equal to approximately one-half ($\frac{1}{2}$) the diameter of the stock from which the stile links are formed.

This depressed channel 15 receives one of the legs 12 of one of the links as best illustrated in Figure 4 of the drawings.

The cap 14 is secured to the link of the stile by a clamping strap or the like 16 which has a main body portion 17 and ends 18 which are slightly reduced in width as illustrated in Figure 4.

Formed in the main body portion 17 of the clamping strap there is a channel 19 which, when the cap 14 is attached to the link of the stile, receives the leg 12 of the link and together with the channel 15 in the end wall of the cap 14 forms means for partially embracing or enclosing the leg 12 of the link.

The clamping strap 16 is secured in link holding position relative to the link preferably by two rivets 20 which, as illustrated in Figure 3 of the drawings, are disposed one upon each side of the leg 12 of the link.

While the member 16 has been referred to as a clamping strap, it is to be understood that the proportions of the depressed channels 15 and 19 are such, that when the cap 14 and the clamping strap 16 are secured to the link, the cap 14 will have free pivotal movement upon the leg 12 of the link to which it is secured.

The cap 14 is provided in its side walls with two diametrically opposed openings 22 and each of the reduced ends 18 of the clamping strap 16 is provided with an opening 23 which, when the clamping strap is shaped to conform to the outer contour of the cap, registers with its respective opening 22 in the side wall of the cap 14.

The rung is provided at each end with an opening or passage 24 so positioned with respect to the end thereof that it may be brought into registration with the openings 22 and 23 of the cap and clamping plate respectively, to receive a rivet 25.

The rivet 25 is of sufficient length to extend slightly beyond the clamping plate 16 to provide material to upset in the form of heads 26.

In assembling the structure, the lengths of chain which form the side stiles 10 of the several ladders are first provided at spaced intervals with the caps which are attached to the links of the stiles in the manner heretofore described prior to the insertion of the ends of the rungs.

After a sufficient number of lengths of stiles 10 to form the completed structure are provided with the proper number of caps, they are secured together by securing the ends of the rungs within the caps by the rivets 25 and thus the rungs serve to maintain the stiles in proper spaced relation.

In the formation of a structure such as is illustrated in Figure 1 of the drawings wherein the rungs are disposed in spaced groups with the rungs in each group in longitudinal alinement with one another, two caps 14 are secured to spaced single links of the stiles except in the case of the border stiles in which instance, but one cap would be attached to the inside leg of the link.

By reference to Figure 5 of the drawings, it will be noted that in cases where the rungs are formed from wood, the ends of the rungs are turned down to a size where they fit snugly within the caps at four points designated A in said figure.

By this construction all load or strain is carried by the caps 14 and the rivets 25 are relieved from strain thereby eliminating all tendencies of the rivets 25 to split the rungs.

The caps 14 also, by reason of their enclosing the ends of the rungs, prevent contact of the end grain with hard objects which might result in a splitting of the rungs.

In Figure 6 of the drawings, there is illustrated a modified form of the invention, in which the rungs 11, although they are secured to the stiles in the same manner as in the heretofore described form of the invention, are disposed in staggered relation to one another between the stiles. Obviously, in this form of the invention, but a single cap 14 is secured to each of the links of the stiles to which the rungs are attached.

Means may be provided to maintain the structure spaced with respect to the side of a ship, a wall, or the like, when it is employed as a ladder.

In Figure 2 of the drawings, there is illustrated such a spacing means which comprises wooden beams 30 which are preferably formed of wood of square cross-sectional form.

These spacing elements, when provided, extend transversely of the structure and may be secured thereto at two or more points by S-links 32, which pass through one of the links of the stiles and through the eye of an eye bolt 31 carried by the beam.

Such spacing means may be so positioned with respect to the length of the stiles as to fall either directly behind the rungs or the rear of the spaces between the rungs, as desired.

While in the foregoing specification, the rungs have been described as being formed of wood and as rectangular cross-sectional shape, the invention is not to be limited to such since rungs of other materials and of other cross-sectional shapes obviously could be employed.

The flexible nature of the stiles 10 together with the free pivotal movement afforded by the connections of the rungs with the stiles, provides sufficient flexibility of the entire structure to permit of its use as a cargo net or sling, it being understood, of course, that when put to such use, the spacing members 30 would not be embodied in the structure.

From the foregoing, it will be apparent that the present invention provides a structure in which the objects and advantages recited, have been accomplished.

Having thus described the invention, what is claimed as new is:

A ladder of the type described comprising in combination, a plurality of parallel spaced chains, ladder rungs disposed in spaced relation to one another between said chains to maintain them in said spaced relation, and means for securing the ends of the ladder rungs to their respective chains, said means comprising a cup-shaped member for receiving the end of a rung, a channel in the outer face of the closed end of the cup-shaped member, a clamping member embracing said cup-shaped member, said clamping member also having a channel which together with the aforementioned channel of the cup-shaped member embraces one side of one of the links of one of said chains, means for securing the clamping member to the cup-shaped member and separate means for securing both the cup-shaped member and the clamping member to the end of the rung.

HAROLD P. HOPP.
EDWARD KUNZELMAN.